United States Patent
Ju et al.

(10) Patent No.: US 10,997,262 B2
(45) Date of Patent: May 4, 2021

(54) INFINITE SCROLLING SEARCH

(71) Applicant: International Business Machines Corporation, Armonk, NY (US)

(72) Inventors: Sangwoo Ju, Ottawa (CA); Andrew Low, Stittsville (CA); Theresa Louise Mammarella, Ottawa (CA); El Houcine Boudoukha, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/561,700

(22) Filed: Sep. 5, 2019

(65) Prior Publication Data

US 2021/0073308 A1    Mar. 11, 2021

(51) Int. Cl.
| | | |
|---|---|---|
| *G06F 16/957* | (2019.01) | |
| *G06F 3/0485* | (2013.01) | |
| *G06F 16/9538* | (2019.01) | |
| *G06F 16/9535* | (2019.01) | |

(52) U.S. Cl.
CPC ........ *G06F 16/9574* (2019.01); *G06F 3/0485* (2013.01); *G06F 16/9535* (2019.01); *G06F 16/9538* (2019.01)

(58) Field of Classification Search
CPC ............. G06F 16/9574; G06F 16/9535; G06F 16/5838; G06F 3/0485
USPC ........................................................ 715/200
See application file for complete search history.

(56) References Cited

U.S. PATENT DOCUMENTS

| | | | |
|---|---|---|---|
| 9,547,668 B2 | 1/2017 | Beckmann | |
| 9,552,439 B1* | 1/2017 | Krecichwost | ......... G06F 3/0482 |
| 9,565,233 B1 | 2/2017 | Ozuysal | |
| 9,613,161 B2 | 4/2017 | Somaiya | |
| 9,971,846 B1 | 5/2018 | Krecichwost | |
| 2001/0005850 A1* | 6/2001 | Graham | ................ G06F 3/0485 |
| 2012/0159393 A1* | 6/2012 | Sethi | ................... G06F 3/04855 |
| | | | 715/830 |
| 2014/0214591 A1* | 7/2014 | Kotinaga | ........... G06Q 30/0631 |
| | | | 705/26.7 |
| 2016/0283076 A1* | 9/2016 | Armstrong | .......... G06F 16/9038 |
| 2017/0205973 A1* | 7/2017 | Somaiya | ............... G06F 3/0485 |
| 2017/0308246 A1 | 10/2017 | Deluca | |
| 2018/0101295 A1* | 4/2018 | Casey | .................... G06F 3/0482 |

OTHER PUBLICATIONS

Karlsson et al., "Adapting infinite-scroll with the user experience in mind," Linköping University, Master thesis, 2016, 36 pages.

(Continued)

*Primary Examiner* — William D Titcomb
(74) *Attorney, Agent, or Firm* — VanLeeuwen & VanLeeuwen; Alexander G. Jochym

(57) ABSTRACT

An approach is provided in which the approach uses a scrolling agent to detect when a browser application requests a set of content from a content provider in response to the browser application receiving a request from a user. The scrolling agent issues a number of browser scroll commands to the browser application and receives sets of next content from the content provider accordingly. The approach searches the sets of next content based on a request invoked by the user and generates a set of search results that the approach provides to the user.

20 Claims, 6 Drawing Sheets

(56) References Cited

OTHER PUBLICATIONS

"Infinite scroll search-friendly recommendations," Google Webmaster Central Blog, Feb. 2014, 6 pages.
Borstein, "Speed up PDF Search with an Embedded Index," Acrobat for Legal Professionals, Jul. 2014, 4 pages.
"Ctrl + F for paginated table," Stack Exchange Inc., May 2018, 8 pages.

* cited by examiner

INFINITE SCROLLING SEARCH

BACKGROUND

Infinite scrolling is highly trending as an interaction behavior on website pages and lists. Massive amounts of data are consumed with the popularity of social media and infinite scrolling offers users an efficient way to browse the information without having to wait for pages to load. Infinite scrolling is advantageous for websites that provide a relatively flat structure, where each unit of content belongs at the same hierarchy level and has a similar chance of being interesting to users.

A website enables infinite scrolling using a plugin that sends requests to a backend server to automatically send the next page of data when the user's scroll position is close to the bottom of a currently loaded page, such as when the scroll position is 80% down the page. By removing the burden of a user having to acquire and click the next page, infinite scrolling keeps the user engaged with the content and less focused on the mechanics of navigating to the next page.

BRIEF SUMMARY

According to one embodiment of the present disclosure, an approach is provided in which the approach uses a scrolling agent to detect when a browser application requests a set of content from a content provider in response to the browser application receiving a request from a user. The scrolling agent issues a number of browser scroll commands to the browser application and receives sets of next content from the content provider accordingly. The approach searches the sets of next content based on a find request invoked by the user and generates a set of search results that the approach provides to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
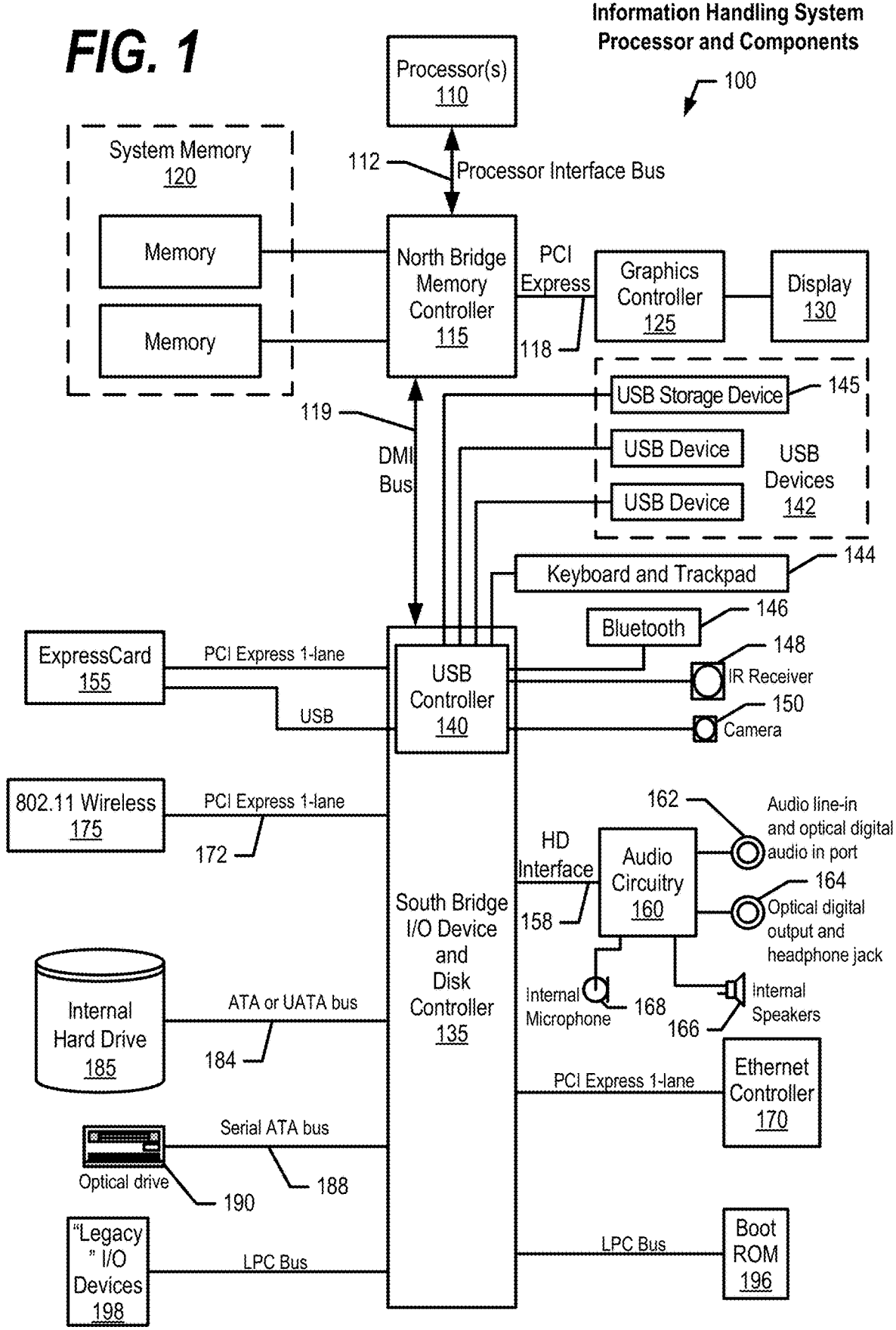
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
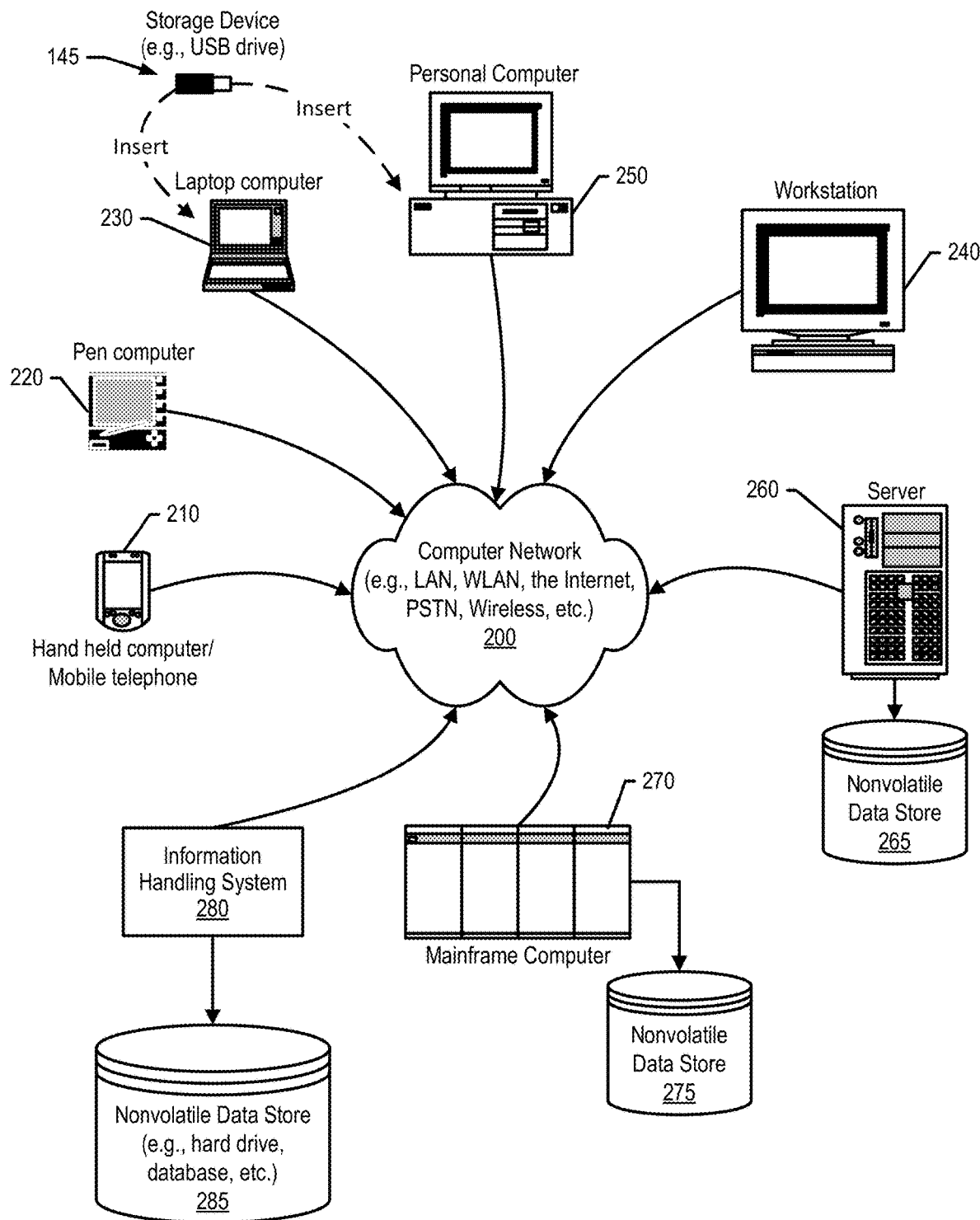
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, infinite scrolling is a web design technique that automatically loads content as a user scrolls down a web page. A challenge found with infinite scrolling, however, is that since not all the data is loaded into the page at the start, browser finds ("ctrl-f") only search a limited amount of data that is currently loaded, which may be a minimal amount of data for infinite scrolling pages. Similarly, a web application using pagination that splits content over several pages only searches the limited amount of data included on a currently displayed page. The amount of data to search even decreases more for pages that contain videos, images, or files with only a small amount of text.

FIGS. 3 through 6 depict an approach that can be executed on an information handling system that uses a scrolling agent to automatically scroll an infinite scroll website in the background to collect webpage data for user finds. The scrolling agent runs in the background and simulates browser actions (e.g., scrolling action down to the bottom of a page), and also checks network calls that have been made for more content. Whenever a user navigates to a web page, the background scrolling agent performs a browser scroll action to the bottom of the page and verifies whether the webpage is an infinite scrolling webpage. If so, the background scrolling agent issues scroll commands in the background, which instigates the webpage's scrolling plugin to request more data from the backend server. Then, when the user performs a find command, such as using a "ctrl-f" key sequence and inputting a keyword, inputting a keyword into a search bar, or other methods of instructing the information handling system to search for a keyword or a set of keywords, the approach provides the user with an option to search the dynamically fetched content or the displayed content.

In one embodiment, when a web page format is known, the background scrolling agent maintains the metadata (e.g., formatting information, non-searchable data, etc.) or filters out the metadata based on how search results are displayed. When the search results are rendered on a display to highlight search results, the metadata is used to display the content correctly. However, when the search results are displayed in a separate window as text only, the scrolling agent filters out the metadata to speed up search result time and conserve memory.

Figure 3:
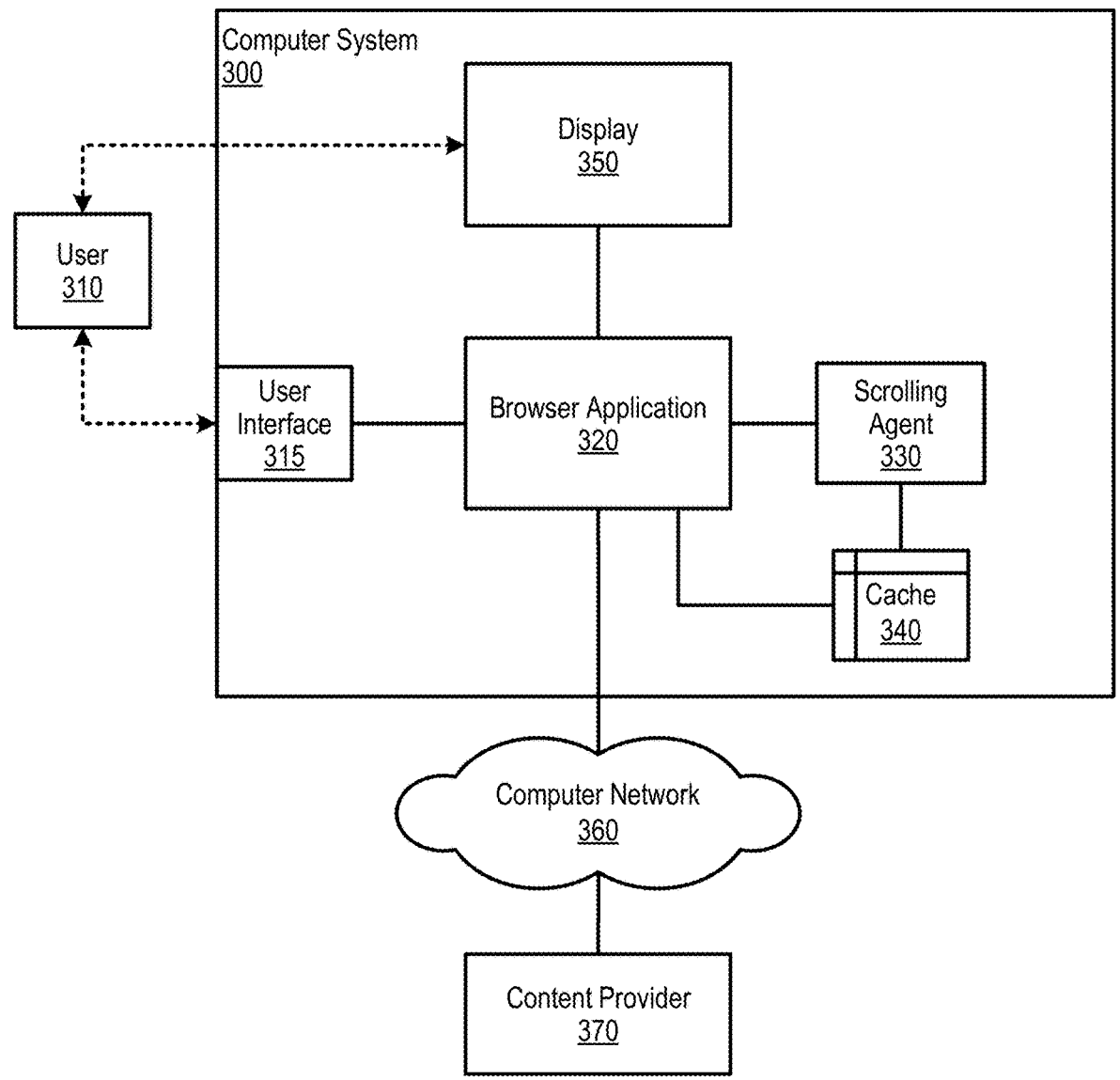
FIG. 3 is an exemplary diagram depicting a computer system using a scrolling agent to capture data from content provider's infinite scrolling website for upcoming user finds.

FIG. 3 is an exemplary diagram depicting computer system 300 using scrolling agent 330 to capture data from content provider 370's infinite scrolling website for upcoming finds from user 310. Computer system 300 includes user interface 315, browser application 320, scrolling agent 330, cache 340, and display 350. In one embodiment, scrolling agent 330 is a plug-in to browser application 320. In another embodiment, scrolling agent 330 is a stand-alone application that interacts with browser application 320. In yet another embodiment, scrolling agent 330 is part of browser application 320.

User 310 interacts with user interface 315 to instruct browser application 320 to navigate to a website through computer network 360 supported by content provider 370. Scrolling agent 330 interacts with browser application 320 and checks whether cache 340 includes content information corresponding to the requested site, indicating that browser application 320 has previously visited the requested website. In one embodiment, the stored content information may be web addresses and indications of whether a website uses infinite scrolling. In this embodiment, the content information could also specify the format of the webpage so scrolling agent 330 knows how to start loading/parsing the webpage correctly.

In another embodiment, cache 340 may store content that include stored pages of data from frequently accessed websites so that scrolling agent 330 does not have to send requests to content provider 370. In another embodiment, when scrolling agent 330 is configured (e.g., based on user 310 preference) to load the data from the web page and then highlight matching search criteria, scrolling agent 330 keeps the metadata in cache 340. In yet another embodiment, when scrolling agent 330 is configured to display the search results in a separate window in text format, scrolling agent 330 may not keep the metadata since the results do not require the metadata.

When cache 340 does not include stored data for the requested site, scrolling agent 330 initiates scroll commands to browser application 320 to determine whether the requested site is an infinite scrolling site. In one embodiment, scrolling agent 330 performs background browser scroll commands to the bottom of the current page and determines whether the website is an infinite scrolling website based on factors such as (i) whether the document height increases (more content is appended to the bottom of the page), (ii) whether HTML (hypertext markup language) or JSON (JavaScript Object Notation) was fetched in the network that is rendered on the page, and/or (iii) whether the page 'rests' at the very bottom of the page without new content having been added. Based on these factors, scrolling agent 330 marks the page as an infinite scroll webpage and adds the information into cache 340. In one embodiment, the added information is the actual page content. In another embodiment, the added information is an indicator that the website is an infinite scrolling site.

At this point, when the webpage is an infinite scrolling webpage, scrolling agent 330 processes the page content accordingly as discussed herein when user 310 performs a find command (ctrl-f). For example, scrolling agent 330 may determine that a JSON blob (binary language object) contains a matching keyword even though the JSON blob is not fetched until further down the webpage (e.g., six or seven fetches). In one embodiment, scrolling agent 330 presents the find results through a browser popup that displays the JSON textual information results and the content opens when user 310 clicks on the JSON textual information containing the matched keyword. In another embodiment, scrolling agent 330 auto-populates user interface 315 with the returned data.

In one embodiment, scrolling agent 330 parses data from an infinite scroll site with many larger media (images/videos) so that scrolling agent 330 provides only the text that user 310 would view without loading the larger media. In this embodiment, scrolling agent 330 loads and parses the data before user 310 begins a browser search to achieve the most accurate results with more of the infinite scroll page loaded.

In another embodiment, scrolling agent 330 enables the infinite search scroll feature and specifies a number of results to search (the bigger the number the more work required by scrolling agent 330). In yet another embodiment, when user 310 clicks on the search results, browser application 320 navigates to a spot on the page that includes the matched content. In yet another embodiment, scrolling agent 330 automatically navigates directly to a first result similar to a standard browser search.

Figure 4:
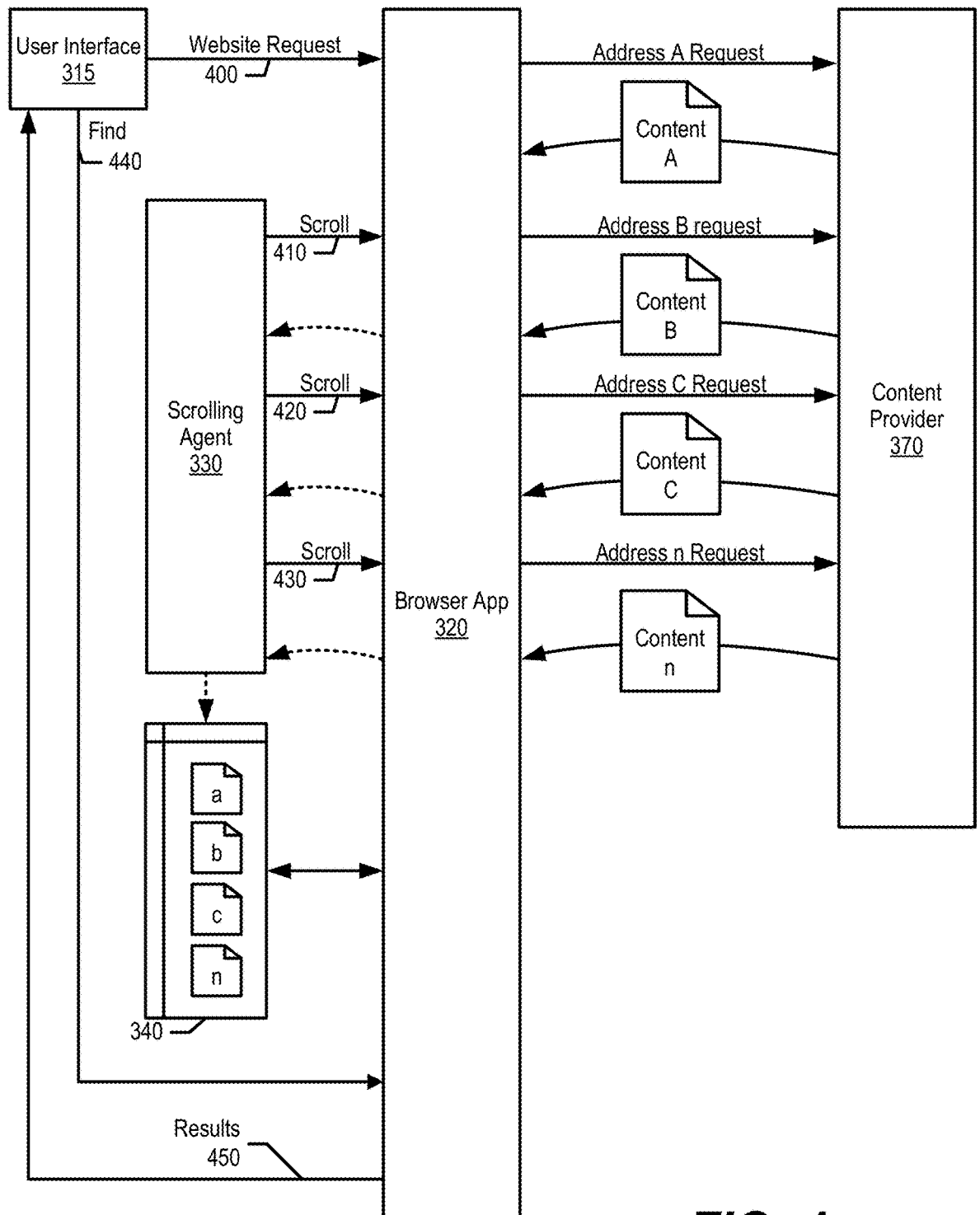
FIG. 4 is an exemplary diagram depicting a scrolling agent sending scroll commands in the background to receive content corresponding to an infinite scrolling website.

FIG. 4 is an exemplary diagram depicting a scrolling agent sending background scroll commands and receiving provider content corresponding to an infinite scrolling website. User 310 uses user interface 315 to send website request 400 to browser application 320, such as by entering a website URL. Browser application 320 sends address "A" request to content provider 370 and, in turn, content provider sends content "A" to browser application 320, which displays content "A" on display 350 and stores the content in cache 340.

Scrolling agent 330 detects website request 400 and determines that the website is an infinite scrolling website using techniques as discussed herein. As such, scrolling agent 330 sends scroll command 410 to browser application 320 which causes the scrolling plugin to issue address "B" request to content provider 370. In turn, content provider 370 provides content "B," which scrolling agent 330 or browser application 320 stores in cache 340.

Likewise, scrolling agent 330 sends scroll commands 420 and 430 to browser application 320, which causes the scrolling plugin to issue address "C" request and address "n" request to content provider 370, respectively. Content provider 370 provides content "C" and content "n" to browser application 320, which scrolling agent 330 or browser application 320 stores in cache 340.

At this point, when user 310 invokes find 440 (e.g., "ctrl-f") via user interface 315, browser application 320 in conjunction with scrolling agent 330 search through cache 340 to find matches. As discussed herein, in one embodiment, when the website address is in a known format, scrolling agent 330 extracts and filters out metadata from objects such as images, videos, etc. In turn, browser application 320 provides the search results 450 to user 310 through user interface 315.

Figure 5:
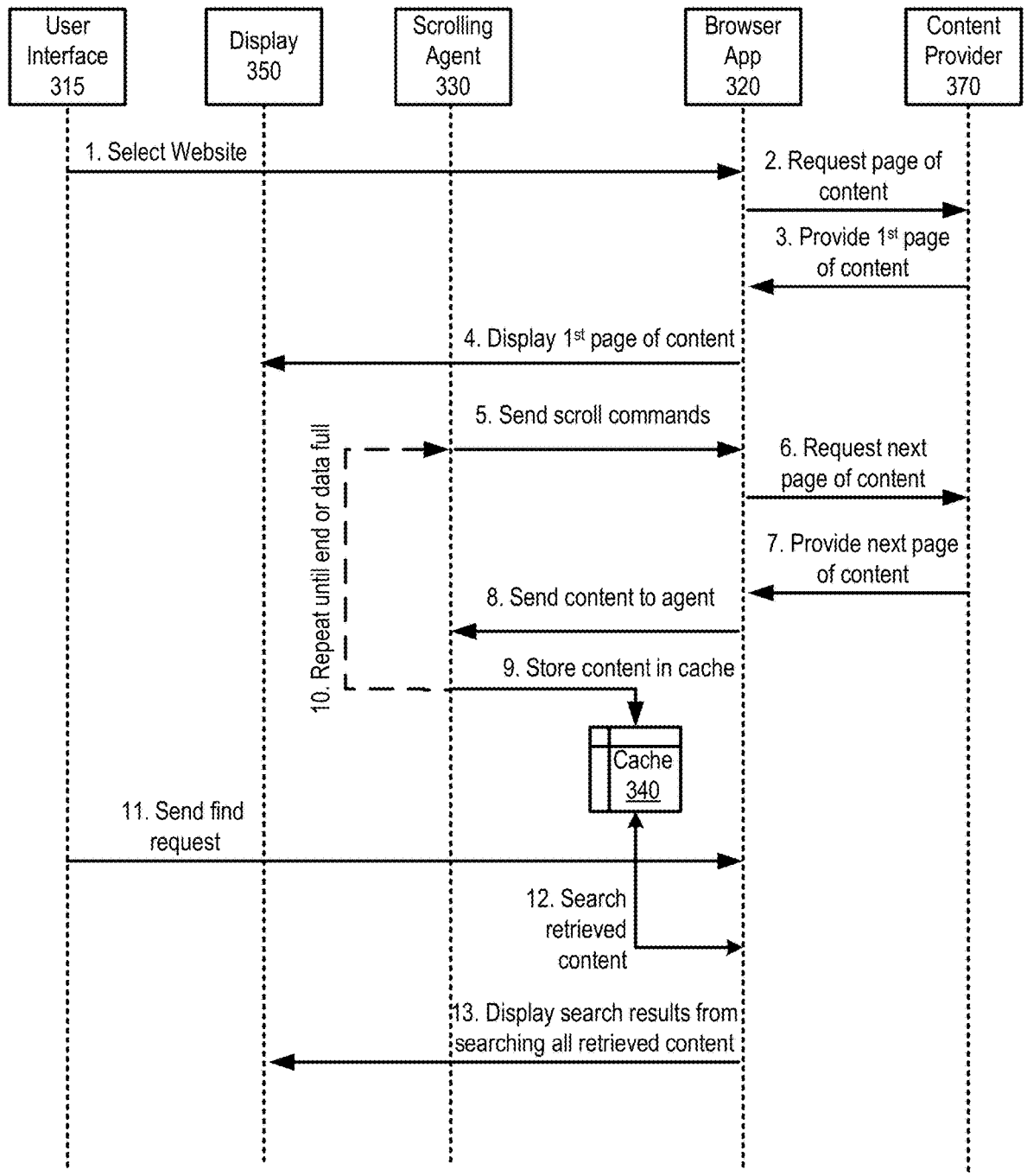
FIG. 5 is an exemplary diagram depicting interaction between the various components of the approach discussed herein.

FIG. 5 is an exemplary diagram depicting interaction between the various components of the approach discussed herein. At step 1, user 310 uses user interface 315 to select a website that user interface 315 sends to browser application 320. At step 2, browser application 320 requests a page of content from content provider 370.

At step 3, content provider 370 provides a first page of content to browser application 320 that, at step 4, browser application 320 displays on display 350. In the background, at step 5, scrolling agent 330 sends scroll commands to browser application 320, which invokes the webpage's infinite scrolling plug-in to request a next page of content from content provider 370 (step 6). In turn, at step 7, content provider 370 sends the next page of content to browser application 320. At step 8, in one embodiment, browser application 320 sends the content to scrolling agent 330, which stores the content in cache 340 (step 9).

At step 10, scrolling agent 330 sends more scroll commands to browser application 320 to receive more content as discussed herein, either a predetermined amount of times or until reaching the end of the page (if the infinite scrolling webpage is finite).

Now, at step 11, when user 310 issues a find request (ctrl-f), user interface 315 sends the request to browser application 320. At step 12, browser application 320 or scrolling agent 330 search the downloaded content in cache 340 to identify matches. As discussed herein, when the content is in a known format (HTML, JSON, etc.) scrolling agent 330, in one embodiment, filters out and ignores metadata associated with objects (images, video, etc.). In turn, browser application 320 displays the search results to user 310 on display 350 using various embodiments as discussed herein (step 13).

Figure 6:
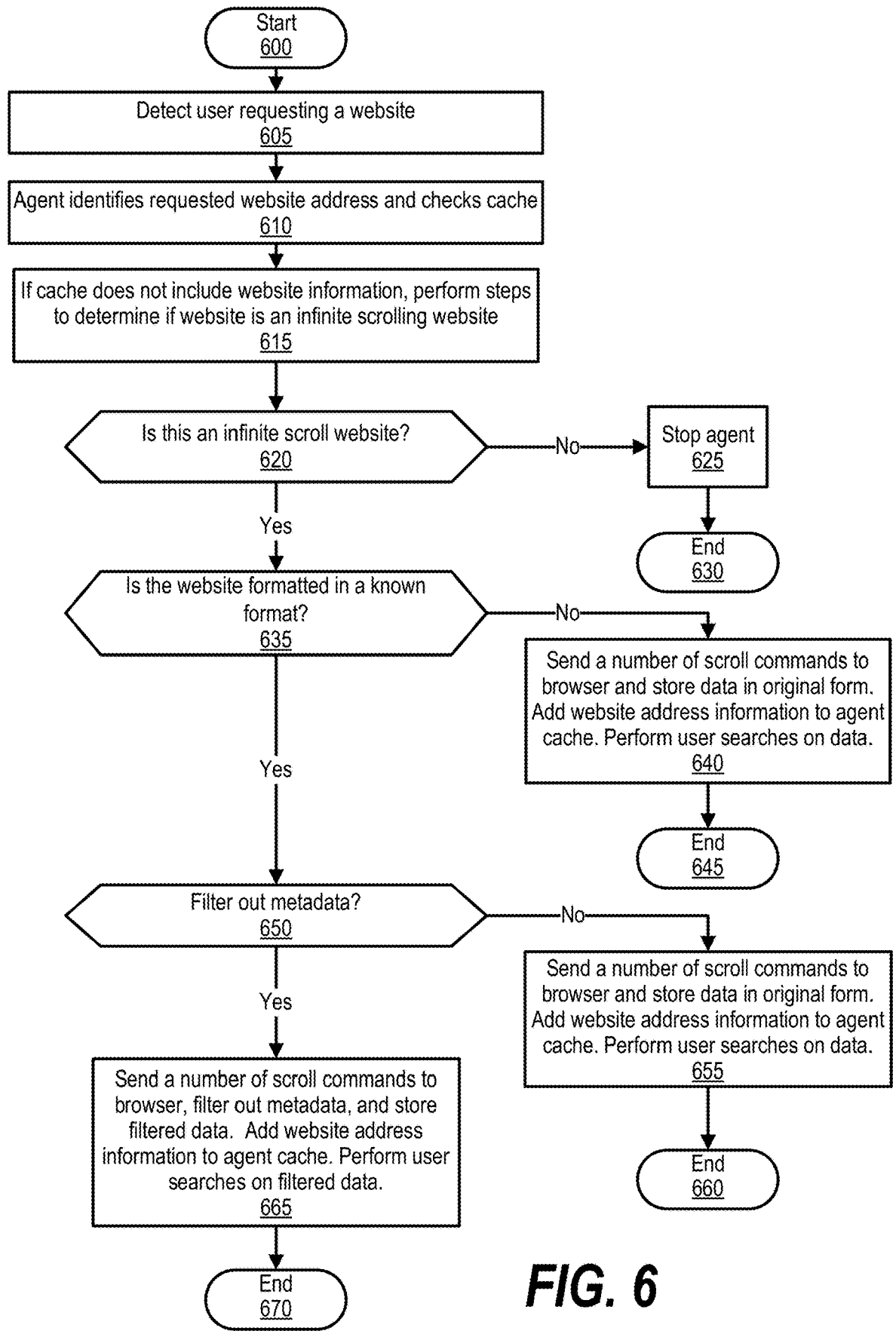
FIG. 6 is an exemplary flowchart showing steps taken to provide infinite scrolling search capabilities to a user.

FIG. 6 is an exemplary flowchart showing steps taken to provide infinite scrolling search capabilities to a user. FIG. 6 processing commences at 600 whereupon, at step 605, the process detects user 310 requesting a website via browser application 320. At step 610, scrolling agent 330 identifies the requested website address and checks cache 340 for information pertaining to the requested website, such as whether the requested website has been previously visited and whether the requested website has been determined to be an infinite scrolling website.

At step 615, if cache 340 does not include information pertaining to the website, the process performs various steps discussed herein to determine whether the website is an infinite scrolling website, such as initiating a number of scroll commands and checking whether the size of the page increases.

The process determines as to whether the requested website is an infinite scroll website, such as from information in cache 340 or from information determined in step 615 (decision 620).

If the requested website is not an infinite scroll website, then decision 620 branches to the 'no' branch whereupon, at step 625, the process stops scrolling agent 330 and allows browser application 320 to function in a typical manner. FIG. 6 processing thereafter ends at 630.

On the other hand, if the requested website is an infinite scroll website, then decision 620 branches to the 'yes' branch whereupon the process determines as to whether the website is in a known format (e.g., HTML, JSON, etc.) (decision 635). If the website is not formatted in a known format, then scrolling agent 330 is not able to filter out metadata and decision 635 branches to the 'no' branch whereupon, at step 640, scrolling agent 330 sends a number of scroll commands and the data is rendered on display 350. User 310 then performs searches on the data that was received from scrolling agent 330's background scrolls. Scrolling agent 330 also adds the requested website address information into cache 340 and notes that the website is an infinite scrolling website in an unknown format. FIG. 6 processing thereafter ends at 645.

Returning to decision 635, if the requested website is in a known format, then decision 635 branches to the 'yes' branch whereupon the process determines whether to filter out metadata from the received content (decision 650). In one embodiment, the process filters out metadata to minimize storage requirements and reduce search times. In another embodiment, the process filters out metadata if user 310 selects to receive search results in a streamlined format. For example, when user 310 wishes to view search results as they appear on a page of data, the process keeps the metadata to properly render the content data and highlight the search results on the content data. However, when user 310 selects to view search results in a streamlined format, the process filters out the metadata and, in one embodiment, displays the search results in a separate window as text only.

If the process should not filter out the metadata, then decision 650 branches to the 'No' branch whereupon, at step 655, scrolling agent 330 sends a number of scroll commands and the data is rendered on display 350. User 310 then performs searches on the data that was received from scrolling agent 330's background scrolls. Scrolling agent 330 also adds the requested website address information in cache 340 and notes that the website is in a known format. FIG. 6 processing thereafter ends at 660.

On the other hand, if the process should filter out the metadata, then decision 650 branches to the 'Yes' branch whereupon, at step 665, scrolling agent 330 sends a number of scroll commands to the browser, the metadata is filtered out, and the text only data is stored in cache 340. User 310 then performs searches on the text only data and scrolling agent 330 adds the requested website address information in cache 340 and notes that the website is in a known format. FIG. 6 processing thereafter ends at 670.

In one embodiment, scrolling agent 330 scrolls a predetermined amount of scrolls to minimize storage requirements on a very large infinite scrolling website (e.g., seven scrolls) and the loaded page data is stored in a volatile memory source such as RAM for the duration that the user is on the page. In this embodiment, the predetermined amount of scrolls may be based on the size of cache 340, the network connection speed, whether the website is in a known format, whether metadata (images, video, etc.) is saved, or various other performance-related parameters. In this embodiment, the caching aspect is an optimization that speeds up repeat visits to a page and data in cache 340 is persistent across user 310 navigating to multiple web pages in one session.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   detecting, by a scrolling agent, that a browser application requested a set of first content from a content provider in response to the browser application receiving a website request from a user;
   in response to the detection that the browser application requested the set of first content:
      issuing, by the scrolling agent, a predetermined number of browser scroll commands to the browser application;
      receiving a set of second content from the content provider in response to issuing the predetermined number of browser scroll commands; and
      storing the set of second content in a storage area;
   receiving a find request at the browser application from the user;
   in response to receiving the find request, searching, by the browser application, the set of first content and the set of second content, wherein the searching generates a set of search results; and
   providing the set of search results to the user.

2. The method of claim 1 further comprising:
   determining whether a document height of the set of first content increases in response to issuing the predetermined number of browser scroll commands; and
   marking a website corresponding to the first set of content as an infinite scrolling website based on the determination.

3. The method of claim 2 wherein the set of second content comprises a set of text and a set of metadata, the method further comprising:
   in response to determining that the website is an infinite scrolling website:
      extracting the set of text from the set of second content;
      storing the extracted set of text in the storage area; and
      searching, by the browser application, the extracted set of text to generate the set of search results.

4. The method of claim 2 wherein, in response to determining that the document height of the set of first content fails to increase in response to issuing the predetermined number of browser scroll commands, storing the set of second content comprising the set of text and the set of metadata in the storage area.

5. The method of claim 1 further comprising:
   loading the set of first content by the browser application, wherein the set of first content comprises an infinite scrolling plugin; and
   sending, by the infinite scrolling plugin, one or more second requests to the content provider in response to the scrolling agent issuing the predetermined number of browser scroll commands to the browser application.

6. The method of claim 1 further comprising:
   receiving a different find request from the user;
   searching, by the browser application, the stored set of second content based on the different find request to generate a set of different search results; and
   providing the set of different search results to the user.

7. The method of claim 1 wherein the scrolling agent issues the predetermined number of browser scroll commands without informing the user.

8. An information handling system comprising:
   one or more processors;
   a memory coupled to at least one of the processors;
   a set of computer program instructions stored in the memory and executed by at least one of the processors in order to perform actions of:
      detecting, by a scrolling agent, that a browser application requested a set of first content from a content provider in response to the browser application receiving a website request from a user;
      in response to the detection that the browser application requested the set of first content:
         issuing, by the scrolling agent, a predetermined number of browser scroll commands to the browser application;
         receiving a set of second content from the content provider in response to issuing the predetermined number of browser scroll commands; and
         storing the set of second content in a storage area;
      receiving a find request at the browser application from the user;
      in response to receiving the find request, searching, by the browser application, the set of first content and the set of second content, wherein the searching generates a set of search results; and
      providing the set of search results to the user.

9. The information handling system of claim 8 wherein the processors perform additional actions comprising:
   determining whether a document height of the set of first content increases in response to issuing the predetermined number of browser scroll commands; and
   marking a website corresponding to the first set of content as an infinite scrolling website based on the determination.

10. The information handling system of claim 9 wherein the set of second content comprises a set of text and a set of metadata, and wherein the processors perform additional actions comprising:
    in response to determining that the website is an infinite scrolling website:
       extracting the set of text from the set of second content;
       storing the extracted set of text in the storage area; and
       searching, by the browser application, the extracted set of text to generate the set of search results.

11. The information handling system of claim 9 wherein, in response to determining that the document height of the set of first content fails to increase in response to issuing the predetermined number of browser scroll commands, the processors perform additional actions comprising:
    storing the set of second content comprising the set of text and the set of metadata in the storage area.

12. The information handling system of claim 8 wherein the processors perform additional actions comprising:
    loading the set of first content by the browser application, wherein the set of first content comprises an infinite scrolling plugin; and
    sending, by the infinite scrolling plugin, one or more second requests to the content provider in response to the scrolling agent issuing the predetermined number of browser scroll commands to the browser application.

13. The information handling system of claim 8 wherein the processors perform additional actions comprising:
    receiving a different find request from the user;
    searching, by the browser application, the stored set of second content based on the different find request to generate a set of different search results; and
    providing the set of different search results to the user.

14. The information handling system of claim 8 wherein the scrolling agent issues the predetermined number of browser scroll commands without informing the user.

15. A computer program product stored in a computer readable storage medium, comprising computer program code that, when executed by an information handling system, causes the information handling system to perform actions comprising:
- detecting, by a scrolling agent, that a browser application requested a set of first content from a content provider in response to the browser application receiving a website request from a user;
- in response to the detection that the browser application requested the set of first content:
  - issuing, by the scrolling agent, a predetermined number of browser scroll commands to the browser application;
  - receiving a set of second content from the content provider in response to issuing the predetermined number of browser scroll commands; and
  - storing the set of second content in a storage area;
- receiving a find request at the browser application from the user;
- in response to receiving the find request, searching, by the browser application, the set of first content and the set of second content, wherein the searching generates a set of search results; and
- providing the set of search results to the user.

16. The computer program product of claim 15 wherein the information handling system performs further actions comprising:
- determining whether a document height of the set of first content increases in response to issuing the predetermined number of browser scroll commands; and
- marking a website corresponding to the first set of content as an infinite scrolling website based on the determination.

17. The computer program product of claim 16 wherein the set of second content comprises a set of text and a set of metadata, and wherein the information handling system performs further actions comprising:
- in response to determining that the website is an infinite scrolling website:
  - extracting the set of text from the set of second content;
  - storing the extracted set of text in the storage area; and
  - searching, by the browser application, the extracted set of text to generate the set of search results.

18. The computer program product of claim 16 wherein, in response to determining that the document height of the set of first content fails to increase in response to issuing the predetermined number of browser scroll commands, the information handling system performs further actions comprising:
- storing the set of second content comprising the set of text and the set of metadata in the storage area.

19. The computer program product of claim 15 wherein the information handling system performs further actions comprising:
- loading the set of first content by the browser application, wherein the set of first content comprises an infinite scrolling plugin; and
- sending, by the infinite scrolling plugin, one or more second requests to the content provider in response to the scrolling agent issuing the predetermined number of browser scroll commands to the browser application.

20. The computer program product of claim 15 wherein the information handling system performs further actions comprising:
- receiving a different find request from the user;
- searching, by the browser application, the stored set of second content based on the different find request to generate a set of different search results; and
- providing the set of different search results to the user.

\* \* \* \* \*